United States Patent Office 2,872,433
Patented Feb. 3, 1959

2,872,433

STABILIZATION OF POLYMERIC N-VINYL PYRROLIDONES WITH SULFUROUS ACID OR ALKALI METAL SALTS THEREOF

Samuel A. Glickman, Easton, Pa., assignor to General Aniline & Film Corporation, New York, N. Y., a corporation of Delaware No Drawing. Application December 27, 1955
Serial No. 555,244

12 Claims. (Cl. 260—45.7)

This invention relates to a process of stabilizing polymeric N-vinyl pyrrolidones with sulfurous acid or the alkali metal salts thereof against discoloration.

Polymeric N-vinyl pyrrolidones are colorless horn- or glass-like materials with a high softening point which are usually employed in solution form as textile assistants, finishing, thickening, sticking, binding or pharmaceutical agents. Among its many applications, the polymers are finding use as additives in a host of cosmetic and pharmaceutical products and as the water-soluble component associated with the preparation of "grafted polymers." These "grafted polymers" are obtained by the polymerization of a monomeric substance in the presence of a water-soluble polyvinyl pyrrolidone to give yarns and fibers of good color stability and enhanced dye receptivity.

It has been the objective of the prior art workers in the polymerization of vinyl pyrrolidone, as disclosed in United States Patent 2,634,259, to secure polymers whose aqueous solutions are colorless. In accordance with the disclosure of said patent, a sample of 25% aqueous vinyl pyrrolidone, buffered with 1.5% disodium phosphate, was polymerized at the reflux point with 1% hydrogen peroxide of 30% strength. The percentages are based on monomer content. The vapors were distilled off leaving the aqueous solution of polyvinyl pyrrolidone. While the partial objective of this patent was to reach a colorless polymer solution, the resulting solution did not possess any great stability towards continual heating as might be encountered in the several commercial applications of the product. Thus, a 10% aqueous solution of polyvinyl-pyrrolidone prepared as above of initial 99.5% transmittance at 430 mμ in a 1 cm. path, dropped to 92.5% after 144 hours at reflux.

In the course of the commercial application of polymeric N-vinyl pyrrolidones, it is frequently necessary to employ the spray dried powders. The exposure of the aqueous polymer solution to the rigors of high temperatures of the spray drying operation has frequently given rise to powders which, when re-dissolved in water or organic solvents, have poor color and poor color stability to heat. In other words, instead of the re-dissolved polymers being colorless they develop an undesirable yellow color.

Polymeric N-vinyl pyrrolidones are employed in the preparation of "grafted polymers," serving as the water-soluble polymeric component which imparts dye substantivity to yarns and fibers prepared in this manner. If fibers produced from the grafted polymers are colored, i. e. yellow or of a yellowish cast due to the poor color stability of the polymeric N-vinyl pyrrolidone, dye substantivity is not effected but the resulting dyed fiber possesses a yellowish or dull cast. Considerable literature on the subject is available and may be found in J. Polymer Science, 4, 767–8; British Patent 715,194; German Patents 801,233, 801,746 and 810,812. Very frequently in the preparation, i. e. in the processing and spinning of polymeric N-vinyl pyrrolidone containing fibers, the use of high temperatures are required. Under these conditions, it is highly desirable to have the polymer capable of resisting heat treatment without development of coloration. No satisfactory methods have been proposed to stabilize such polymers so that they would be capable of resisting heat treatment without development of color.

It is an object of the present invention to stabilize polymeric N-vinyl pyrrolidones and copolymers thereof by treatment with sulfur dioxide, sulfurous acid or an alkali metal salt thereof.

A further object is to stabilize polymeric N-vinyl pyrrolidones and copolymers thereof in polymerization liquor prior to spray, hot roll, or drum drying, and in wet and dry spinning operations.

Other objects and advantages will become apparent from the following description.

I have found that polymeric N-vinyl pyrrolidones and copolymers thereof can be very readily stabilized at any time but preferably immediately following polymerization or copolymerization, or the polymerization liquor consisting of a polymer or copolymer in a suitable solvent, by treatment with a small quantity of sulfur dioxide (sulfurous acid anhydride) sulfurous acid or alkali metal salt thereof, such as sodium, potassium, or lithium bisulfite, in an amount ranging from 0.2 to 1.0% based upon the weight of the polymer or copolymer. The concentration of sulfurous acid equivalent to that of the alkali metal bisulfite may be obtained by introducing sulfur dioxide gas into the aqueous solution or dispersion of the polymer or copolymer. In the event the polymer or copolymer is dissolved in an organic solvent, an equivalent amount of sulfurous acid prepared in a normal way may be added to such solution. The sulfurous acid or alkali metal salt thereof may be added to the polymer or copolymer, i. e. in the polymerization liquor prior to spray, hot roll or drum drying and wet and dry spinning operations or any other processing including exposure to heat, e. g. sterilization and the use of heated solutions.

Other methods of treatment will become more apparent from the working examples.

The polymeric N-vinyl pyrrolidones which may be stabilized in accordance with the present invention are characterized by the following formula:

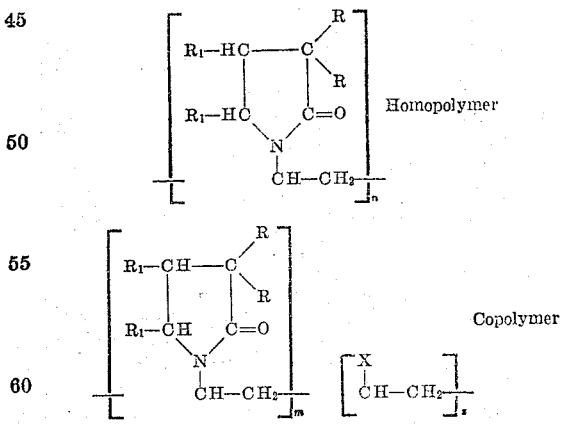

where R represents either hydrogen or methyl groups, and $R_1$ represents either hydrogen, methyl or ethyl groups, and $n$, $m$, $z$ represent a number indicative of the degree of polymerization and X is halogen, e. g. chlorine, carbalkoxy, e. g. —$COOCH_3$, —$COOC_2H_5$ etc., cyano, acyloxy, e. g. —$OCOCH_3$, —$OCOC_2H_5$ etc., aryl, e. g. phenyl, alkoxy, e. g. methoxy, ethoxy, butoxy and aryloxy, e. g. phenoxy.

All of the specific polymeric materials characterized by the foregoing general formula are commercially available and are known polymeric N-vinyl pyrrolidones. They are obtained by polymerizing the following monomers:

N-vinyl-2-pyrrolidone
N-vinyl-5-methyl pyrrolidone
N-vinyl-5-ethyl pyrrolidone
N-vinyl-3,3-dimethyl pyrrolidone
N-vinyl-4-methyl pyrrolidone
N-vinyl-4-ethyl pyrrolidone Copolymers are obtained by copolymerization of the aforementioned N-vinyl-2-pyrrolidones with monomers such as vinyl chloride, vinyl acetate, vinyl propionate, acrylonitrile, methyl acrylate, ethyl acrylate, styrene, and the like.

Depending upon the extent of polymerization, the polymeric N-vinyl pyrrolidones have molecular weights ranging from 500 to 200,000. Viscosity measurements are used as an indication of the average molecular weight of the polymers which are characterized by a chain of carbon atoms to which the lactam rings are attached through their nitrogen atoms:

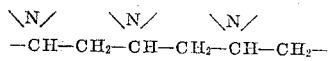

The viscosity coefficient, K, which is fully described in Modern Plastics, 23, No. 3, 157–61, 212, 214, 216, 218 (1945) is calculated as follows:

$$\frac{\log \eta \text{ rel}}{C} = \frac{75K^2}{1+1.5KC} + K$$

where C is the concentration in grams per 100 cc. of polymer solution and $\eta$ rel is the ratio of the viscosity of the solution to that of pure solvent. The K values are reported as 1000 times the calculated viscosity coefficient in order to avoid the use of decimals. For the purpose of the present invention, I employ those polymers having a K value of 10 to 100, preferably of 30 to 100 because of their viscosity at lower concentrations.

The number of recurring polymer units enclosed by brackets in the foregoing general formula, indicated by "$n$" the extent or degree of polymerization, corresponds to a chain of 192 to 980 monomer units. In actual practice, a mixture of polymer each containing a different number ($n$) of monomer units is always produced. The polymers are readily prepared by the procedural steps given in United States Patents 2,265,450, 2,317,804 and 2,335,454 and in which working examples of all the species characterized by the above formula are given and the teachings of which are incorporated herein by reference. The copolymers are prepared in the conventional manner.

The following examples will serve to illustrate how the various polyvinyl pyrrolidones and copolymers thereof may be stabilized in accordance with the present invention.

It is to be understood, however, that these examples are merely illustrative and are not to be considered as being limitative of the invention disclosed and claimed.

All the parts are by weight unless otherwise noted.

*Example I*

A virtually colorless 3½% aqueous solution of polymeric N-vinyl-2-pyrrolidone prepared from the spray dried powder had an initial comparison transmittance of 97.4% at 435 m$\mu$ in a 5 cc. cell with a 1 cm. light path. Steam sterilization of this clear solution at 240–250° F. for ½ hour resulted in a noticeable yellowing and discoloration to give a material of 91% transmittance at 435 m$\mu$.

The addition of 0.28, 0.57 and 1.14% sodium bisulfite to the respective samples of the above unheated colorless solutions, followed by steam sterilization at 240–250° F. for ½ hour gave colorless solutions with respective percent transmittance of 95.1, 96.2 and 96.3% at 435 m$\mu$.

From the foregoing example, it becomes clearly manifest that as little as 0.28% of sodium bisulfite (based on polymer content) to aqueous polymeric N-vinyl-2-pyrrolidone solutions is extremely effective in inhibiting color formation in the process of steam sterilization in the preparation of the polymer for cosmetic uses and for industrial applications where an aqueous solution of the polymer is required.

It is to be noted that the role of sulfur dioxide (sulfurous acid) and the alkali metal bisulfite is not attributed to that of a bleaching agent. The following two experiments demonstrate that both sulfur dioxide and an alkali metal bisulfite such as sodium bisulfite fail to alter the color of heated aqueous solutions of polymeric N-vinyl-2-pyrrolidone. Thus, it becomes clearly manifest that the effect of both the sulfurous acid and the alkali metal bisulfites is inhibitive rather than one of bleaching.

*Example II*

A 10% aqueous solution of polymeric N-vinyl-2-pyrrolidone, prepared from the spray dried powder, had an initial percent transmittance of 93% at 435 m$\mu$ in a 1 cm. path cell. Autoclaving at 240–250° F. for ½ hour resulted in extensive yellowing and discoloration to give a solution of 76% transmittance at 435 m$\mu$. This yellowed solution of 76% transmittance was treated with sodium bisulfite to reach a solution containing 0.5% bisulfite, based on the polymer. Autoclaving at 240–250° F. for ½ hour resulted in a yellow solution of 76% transmittance at 435 m$\mu$, closely identical to its original value. This indicates that the sodium bisulfite is of no value in bleaching or restoring a polymeric N-vinyl-2-pyrrolidone solution to its former colorless state once it had suffered yellowing in a heat treatment.

The inhibitive effect of sodium bisulfite is easily demonstrated by adding 0.5% bisulfite, based on the polymer, to the original 10% aqueous solution of polymeric N-vinyl-2-pyrrolidone of initial percent transmittance of 93% at 435 m$\mu$. Autoclaving for ½ hour at 240–250° F. resulted in a solution of 93% transmittance.

*Example III*

In a fashion similar to Example II above the addition of sulfurous acid (in equimolar amount to bisulfite in Example II) to a 10% aqueous solution of polymeric N-vinyl-2-pyrrolidone, which had suffered yellowing on autoclaving at 240–250° F. for ½ hour, failed to show any bleaching effect. The yellowed solution of 76% transmittance remained virtually the same.

The inhibitive effect of the sulfurous acid could be demonstrated, as in Example II, where the original sample of 93% transmittance gave a sample of 94% transmittance following autoclaving at 240–250° F. for ½ hour.

Thus, it is to be noted that once an aqueous solution or for that matter a solution in an organic solvent of the polymer or copolymer of good initial color undergoes yellowing on standing, the addition of sulfur dioxide, sulfurous acid or an alkali metal salt thereof in the aforementioned concentrations will not restore the original water-white color. Accordingly, therefore, it is absolutely essential that the addition of sulfurous acid or alkali bisulfite be made to the polymer or copolymer, prior to heating of aqueous solutions, or to solutions in organic solvents immediately following the polymerization or copolymerization reaction prior to use or storage.

*Example IV*

A colorless 10% aqueous solution of polymeric N-vinyl-2-pyrrolidone, prepared from polymerization liquors, had an initial percent transmittance of 97.0% at 435 m$\mu$ in a 1 cm. path cell. Autoclaving at 240–250° F. for ½ hour resulted in extensive yellowing and discoloration to give a solution of 83% transmittance at 435 m$\mu$.

The incorporation of 0.30% sulfur dioxide, added as a dilute sulfurous acid solution to the above 10% solution of the polymer, was performed prior to autoclaving. The resulting solution was steam sterilized for ½ hour at 240–250° F. and gave a colorless solution of 97% transmittance at 435 mµ comparable in every way to the unheated initial material.

In a fashion similar to the above, 0.5% sodium bisulfite was added to the control 10% solution prior to heat treatment. The resulting steam sterilized solution underwent no yellowing and gave material of 97% transmittance at 435 mµ.

*Example V*

The continued heating of 10% polymeric N-vinyl-2-pyrrolidone at reflux temperature for a number of hours produces a yellow-orange coloration indicative of the formation of degradation products. Thus, a visibly colorless 10% solution of initial percent transmittance of 96.5% at 430 mµ suffers discoloration at the end of 48 hours of heating at the boil to give a deep yellow-orange solution of 67% transmittance.

Starting with a similar initial solution, modified by the addition of 0.5% potassium bisulfite, the same 48 hours reflux period gave a scantly pale yellow solution of 90.2% transmittance.

The formation of coloration is in both instances gradual and the percent transmittance at various time intervals is given below for the control and stabilized materials.

| Samples | Percent Transmittance at Various Times in Hours | | | | |
|---|---|---|---|---|---|
| | 0 | 1 | 6 | 24 | 48 |
| Control Solution | 96.5 | 95.0 | 86.0 | 77.0 | 67.0 |
| 0.5% Potassium Bisulfite Stabilized Solution | 96.5 | 95.8 | 93.8 | 93.8 | 90.2 |

*Example VI*

Example I was repeated with the exception that polymeric N-vinyl-2-pyrrolidone was replaced by an equivalent amount of polymeric N-vinyl-5-methyl pyrrolidone.

*Example VII*

Example IV was repeated with the exception that polymeric N-vinyl-2-pyrrolidone was replaced by an equivalent amount of polymeric N-vinyl-5-ethyl pyrrolidone.

*Example VIII*

Example IV was again repeated with the exception that polymeric N-vinyl-2-pyrrolidone was replaced by an equivalent amount of polymeric N-vinyl-3-methyl pyrrolidone.

*Example IX*

Example V was repeated with the exception that polymeric N-vinyl-2-pyrrolidone was replaced by an equivalent amount of polymeric N-vinyl-4-methyl pyrrolidone.

The results obtained with Examples VI to IX were substantially the same as Examples I, IV, and V.

Copolymers of N-vinyl pyrrolidone with other polymerizable monomers are also discolored on heating of aqueous or organic solvent solutions or on standing. The addition of sulfur dioxide (sulfurous acid) or sodium bisulfite to vinyl pyrrolidone copolymers in bulk or solution is also beneficial. Vinyl compounds copolymerizable with vinyl pyrrolidone include vinyl ethers, acrylic nitriles, vinyl halides, e. g. vinyl chloride, vinyl esters, e. g. vinyl acetate, alkyl acrylates and the like.

*Example X*

A copolymer of acrylonitrile and N-vinyl-2-pyrrolidone was prepared according to Example I of U. S. P. 2,713,573. The thoroughly washed and dried polymer was incorporated to an extent of 7% in a medium consisting of 45% zinc chloride, 15% magnesium chloride, 39.95% water and 0.05% potassium bisulfite. The above mixture was stirred and subjected to heating at 95° C. for several hours to aid in the solution of the polymer. The solution, which was colorless, was forced through spinnerets into a coagulating bath at 15° C. Colorless filaments were thereby produced.

In a control experiment, where the bisulfite was omitted, the spinning solution had acquired a yellow-orange coloration by the time solution of the polymer had taken place. The filaments produced by forcing the solution through spinnerets into a coagulating bath were cream to yellow colored.

*Example XI*

A grafted polymer was prepared from acrylonitrile and polymeric N-vinyl-2-pyrrolidone, according to the procedure of Example 17 of British Patent 715,194. The product was dissolved in dimethyl formamide, containing 0.1% by weight potassium bisulfite, to give a 15% solution by heating to 125° C. with stirring. The solution, which was virtually colorless, was spun according to the procedure of Example 18 of the aforesaid patent to yield colorless filaments.

The corresponding filaments produced by the procedure of Example 18 of the aforesaid patent were cream to yellow colored as contrasted with the colorless filaments obtained in the analogous procedure wherein potassium bisulfite was present.

The use of polymeric N-vinyl pyrrolidones for various cosmetic applications has placed the specification of low odor on the product. This low odor requirement has made it necessary to conduct the polymerization at high temperatures for protracted periods of time to ensure a more complete utilization of the odorous monomer. During this protracted heating time the discoloration of the polymeric solution takes place. The incorporation of sulfurous acid or an alkali metal salt thereof results in a remarkably stable solution with hardly any development of yellow color.

During the course of my experimentation, it has been observed that the concentrated aqueous solutions of polymeric N-vinyl pyrrolidones of good initial color undergo yellowing on standing for periods of time. The incorporation of as little as 0.25% of sulfur dioxide, sulfurous acid or an alkali metal salt of sulfurous acid based on the weight of the polymer, results in solutions that will be stable over a considerable period of time.

It is to be understood that by the term "polymeric N-vinyl pyrrolidone" as employed in the appended claims, homopolymers (N-vinyl pyrrolidone), homologues of N-vinyl pyrrolidone and grafted polymers wherein the water-soluble component is a polymer of N-vinyl pyrrolidone are included.

I claim:

1. A process of stabilizing a solid polymeric N-vinyl pyrrolidone against discoloration which comprises uniformly dispersing into a solution of the said pyrrolidone, in a solvent in which the said pyrrolidone is soluble, from 0.2 to 1% by weight of a reagent selected from the group consisting of sulfur dioxide, sulfurous acid and alkali metal salts of sulfurous acid, and recovering the stabilized solid polymer from said solvent.

2. The process according to claim 1 wherein the polymeric N-vinyl pyrrolidone is polymeric N-vinyl-2-pyrrolidone.

3. The process according to claim 1 wherein the polymeric N-vinyl pyrrolidone is polymeric N-vinyl-5-methyl pyrrolidone.

4. The process according to claim 1 wherein the polymeric N-vinyl pyrrolidone is a copolymer of N-vinyl-2-pyrrolidone and acrylonitrile.

5. The process according to claim 1 wherein the polymeric N-vinyl pyrrolidone is a grafted polymer prepared from acrylonitrile and poly-N-vinyl pyrrolidone.

6. The process according to claim 1 wherein the polymeric N-vinyl pyrrolidone is polymeric N-vinyl-4-methyl pyrrolidone.

7. A color stable composition consisting essentially of solid polymeric N-vinyl pyrrolidone having uniformly dispersed therein from 0.2 to 1% by weight of a reagent selected from the class consisting of sulfur dioxide, sulfurous acid and alkali metal salts of sulfurous acid.

8. A color stable composition according to claim 7 wherein the polymeric N-vinyl pyrrolidone is polymeric N-vinyl-2-pyrrolidone.

9. A color stable composition according to claim 7 wherein the polymeric N-vinyl pyrrolidone is polymeric N-vinyl-5-methyl pyrrolidone.

10. A color stable composition according to claim 7 wherein the polymeric N-vinyl pyrrolidone is a copolymer of N-vinyl-pyrrolidone and acrylonitrile.

11. A color stable composition according to claim 7 wherein the polymeric N-vinyl pyrrolidone is a grafted polymer prepared from acrylonitrile and poly-N-vinyl pyrrolidone.

12. A color stable composition according to claim 7 wherein the polymeric N-vinyl pyrrolidone is polymeric N-vinyl-4-methyl pyrrolidone.

References Cited in the file of this patent

UNITED STATES PATENTS

| | | |
|---|---|---|
| 2,072,465 | Reppe et al. | Mar. 2, 1937 |
| 2,495,918 | Bolton | Jan. 31, 1950 |
| 2,548,169 | Miller | Apr. 10, 1951 |
| 2,712,995 | Weyde | July 12, 1955 |